United States Patent Office 3,281,042

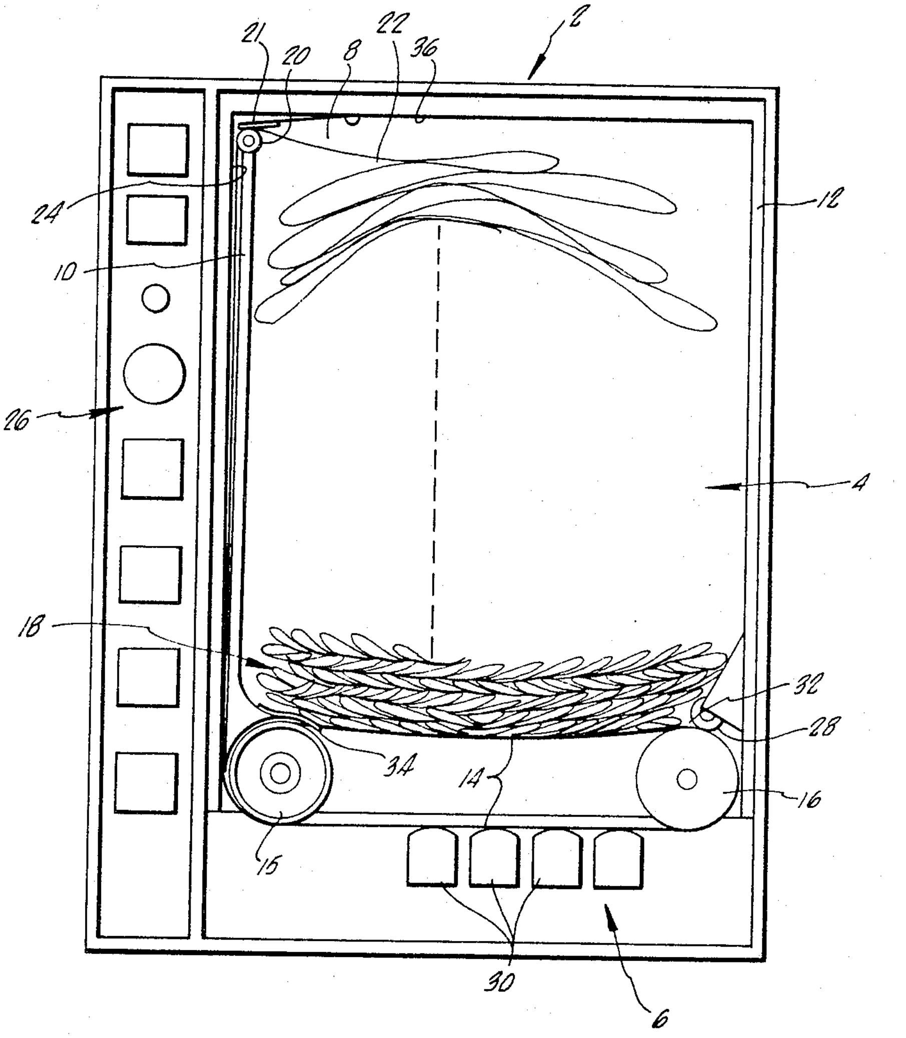
INVENTORS.
JOHN A. HARDISON
DAVID T.L. CHANG
BY
Christie, Parker & Hale
ATTORNEYS.

Patented Oct. 25, 1966

3,281,042

CONTINUOUS LOOP TAPE STORAGE APPARATUS

John A. Hardison, Glendora, and David T. L. Chang, Altadena, Calif., assignors to Consolidated Electrodynamics Corporation, Pasadena, Calif., a corporation of California Filed Aug. 31, 1964, Ser. No. 393,121
8 Claims. (Cl. 226—118)

This invention relates to magnetic tape transports and more particularly to a continuous loop storage arrangement for use with magnetic tape transports. Specifically, the invention relates to the storage bin of the tape transport and to the means by which the tape is fed to and from the storage bin.

In general, magnetic tape transports use one of two methods for storing tape before and after periodic use in the transport's operational zone, i.e., the zone containing recording and reproducing magnetic heads. The first method is reel storage, the second, continuous loop storage. Under the heading of continuous loop storage transports there have in the past been four methods by which continuous loops are stored and fed into and out of their storage location.

The first of these four methods is to use what is commonly referred to as a random gravity bin. In such an apparatus tape is fed by the force of gravity into the top of an open container and is allowed to pile loosely within the container in a random manner. On removal from the bin the tape is extracted from the bottom of the tape pile through an exit normally located at or near the top of the bin. This extraction is made against the pressure of tape stacked above it and is subject to several disadvantages. In particular, the tension on the tape as it is removed from the bin is highly variable due to variable friction forces against which it is pulled. Such a variation in tape tension causes a high degree of flutter in the tape passing through the operational zone. To combat this problem, the bin capacity must be limited to the point where the amount of tape accumulated on top of the particular portion being extracted can not exert a significant amount of pressure on it. In addition, tape entering the bin undergoes a static charge buildup which causes it to be electrostatically attracted to adjacent tape portions. The tape then gathers in an accumulation of small loops adjacent the bin entrance thus resulting in periodic jamming at this point.

A second general method by which tape is stored in continuous loops is to use what is generally referred to as a roller supported loop such as is described in U.S. Patent No. 3,024,957 assigned to the present assignee.

The third method of tape storage employs what is referred to as the inside-outside reel. This method finds particular usefulness in the radio broadcasting field for use in storing commercial and spot announcements which are to be broadcast repeatedly. In this method the tape is stored on a reel in such a way that it can be removed from the center of the reel, i.e., adjacent the hub and replaced on the outer diameter. While this device has the highest storage efficiency of any endless loop method, there are several disadvantages including complexity of design, the need for using lubricated tape and short tape life. Even with a lubricated tape, very high friction forces are encountered when removing the tape due to the presence of the tightly wound reel of tape above the particular strip being removed. This imposes a requirement for large amounts of drive power and results in significantly high tape tension. Extensive friction variations are also encountered resulting in high flutter. In addition, this arrangement is relatively inflexible in that the length of the continuous loop in each design is fixed within relatively narrow limits.

The fourth and final method generally used in the art uses what is usually referred to as the force-fed random storage bin. A storage bin of this type is described in co-pending application Serial No. 93,696, filed March 6, 1961, now Patent No. 3,161,337 and assigned to the present assignee. This method of storing tape is an improvement on the gravity-fed random bin previously described and normally provides a roller or wheel at the top of the bin which is used to feed tape into the storage area. Tape is fed therein in the form of long loops which are formed due to the interaction of the tape roller and the accumulated tape gathered within the storage bin below the wheel. As in the gravity feed bin, tape in this type of bin is also subject to variable friction forces as it is removed from the bottom of the tape pile thus resulting in flutter and limited bin capacity.

The present invention provides a tape storage apparatus for closed tape loop elements comprising a bin and a movable belt defining the bottom of the bin. A tape entrance is provided adjacent the movable belt at one side of the bin and a tape loop stripping element is located adjacent the movable belt on the side opposite the entrance to the bin. By the coaction of the tape loops accumulated in the bin and the movable belt, tape introduced to the bottom of the bin is formed into loops which grow until they approximate the width of the bin whereupon they are stripped from the belt by the stripping element and a new loop begun at the tape entrance.

The apparatus of this invention provides a compact, economic and dependable mechanism in which storage efficiency is increased over prior designs and problems due to flutter, short tape life and static charge buildup are minimized. In addition, the mechanism is relatively simple and lends itself well to a magazine loading application.

The following detailed description of the apparatus of this invention may be more clearly understood by reference to the accompanying figure which is a vertical section of the random storage bin of the invention.

A transport unit 2 comprises a storage compartment 4 and operational compartment 6. Compartment 4 is a storage bin in which tape is gathered and from which it is continuously paid out through the top of the bin for transport to an operational compartment 6 wherein magnetic record and reproduce heads are located. The bin itself comprises a back 8 and sides 10 and 12. The bottom of the bin is formed by means of an endless belt 14 which is wrapped around an idler wheel 15 and a drive wheel 16 and communicates between the storage bin 4 and the operational compartment 6. A front (not shown) faces the backing 8 and serves to confine an accumulation of tape 18 within the bin. The transverse dimension of the bin measured from the front to the back 8 of the bin is approximately equal to the width of the tape stored within the bin in order to assure that the tape loops remain essentially in layer form with respect to the bottom of the bin.

Provided generally above the accumulation of tape 18 is a guide roller 20 and friction pad 21 located atop the side 10 for guiding an increment of tape filament 22 from the top of the accumulation of tape into a channel 24 defined by the side 10 of the bin 4 and the remaining structure 26 of the tape transport.

Tape is guided around the idler wheel 15 where it first comes in contact with the endless belt 14. The tape then passes through the operational compartment 6 in contact with the belt. At the opposite end of the zone 6 the sandwiched belt and tape pass around the drive wheel 16 and between the drive wheel and a pinch roller 28. The roller 28 holds the tape snugly against the belt 14 and in cooperation with drive wheel 16 provides the drive means for extracting the tape from the bin, passing it into and through the operational area and back into the bin.

The operational compartment as depicted in the accompanying figure is located adjacent and below the bin 4 and includes a number of magnetic record and reproduce heads 30 past which the tape filament is guided. The endless belt 14 is normally made of a material which provides a good frictional contact with the magnetic tape, preferably polyethylene. It is one of the functions of the endless belt 14 to engage the tape 22 adjacent the idler wheel 15 and hold the tape in close relationship with the heads 30 thereby providing a good head to tape relationship and improved transport performance.

A pinch roller 28 located adjacent drive wheel 16 holds the tape in contact with the endless belt 14 and wheel 16 after the tape and belt pass out of the operational compartment preparatory to entry into the storage bin. Roller 28 in conjunction with wheel 16 defines a tape entrance 32 to the storage bin. On the side of the bin opposite the tape entrance 32, a tape stripping element 34 is provided for separating fully formed loops from the endless belt 14 and simultaneously causing a new loop to be started at the entrance 32.

In operation, tape is transported through the operational compartment and with the drive belt 14 passes between the drive wheel 16 and pinch roller 28 into the entrance 32 to the storage bin. As a particular portion of filament enters the storage bin a loop is formed and the accumulation of tape 18 coacts with the drive wheel 16 and the endless belt 14 to cause the loop to be pressed against the endless belt 14. When the loop is carried by the belt 14 to the side of the bin opposite the entrance 32 it is brought into contact with the tape stripping element 34. The force of coincidence of loop and loop stripping element is reflected back to the tape entrance by the longitudinal stiffness of the tape where the coaction of this force with that of the belt 14 and the mass of tape 18 causes a new loop to be begun. The accumulation of tape 18 above the newly formed loop now serves to hold this loop in contact with the endless belt 14 as it proceeds across the width of the bin 4. When the loop reaches the stripping element 34 it is stripped from the endless belt as it passes beneath the stripping element and back into engagement with the idler wheel 15 and on into the operational compartment where it comes in contact with a succeeding increment of the tape filament.

The stripped loop now forms the bottom of the accumulation of tape in the storage bin and at the same time coacts with the accumulation of tape and the endless belt to cause another loop to be formed at the tape entrance 32. In this way loops are periodically formed at the bottom of the bin as the tape transport is operated. As succeeding loops are formed, a given loop is raised by the growth of tape thereunder until it reaches a point near the top of the bin where it is extracted over guide roller 20 and transported to the operational compartment. Friction pad 21 is used to maintain a small amount of tension on the tape between the guide roller 20 and idler wheel 15.

As can be seen from the accompanying illustration the tape is fed into the storage bin in the form of long loops thus minimizing tape wrinkle and creasing due to the weight of tape accumulated above it. In addition, the present invention enables removal of the tape from the top layer in the bin rather than the bottom as has been customary with storage bins in the prior art and thus the tape need not be pulled out against large resisting forces.

Such a design provides numerous other advantages including a relatively high storage efficiency, i.e., an increased length of tape stored per unit volume. The bin of this invention is capable of achieving a 10% storage efficiency whereas with the exception of the inside-outside reel the efficiencies of the methods described previously range from 6% to less than 1%.

Equally important a tape transport employing the storage bin of this invention has an extremely low flutter characteristic when tape loads are maintained below a predetermined maximum. This is due to the fact that the bin is normally not completely filled and tape is removed from the top of the bin where pressure on the top layer is constant at zero. Even when the bin is filled to the top 36, pressure on the top layer is still essentially constant. This constant pressure means very little variation in tape tension as it is extracted from the top of the bin and hence little or no flutter as the tape passes through the operational area.

Moreover, the life of tape used with a transport and storage bin of this invention is relatively long compared to other tape storage means since no tape lubricant is needed and the tension level on the tape throughout a cycle of operation is low. Since tape is extracted from the top of the bin where the reaction force of one loop on another is relatively low and the tape is rather loosely stored, static electric charge buildup on the tape is not a problem and does not affect the extraction of tape from the top of the bin, thereby minimizing this problem as a cause of jamming of the mechanism.

What has been provided then, is a bottom feed tape storage bin for use in a tape transport which has achieved a substantial improvement in four major continuous loop tape transport areas: (a) storage efficiency, loop length is maximized in a minimum area, (b) flutter, tape tension variations are minimized, (c) tape life, wear and tension on tape is reduced and usable tape life is maximized, and (d) design, the complexity of the mechanism is minimized.

We claim:

1. In a closed loop tape transport apparatus having an operational compartment and a storage compartment, the improvement comprising: a movable belt communicating between the operational and storage compartments and defining the bottom of the storage compartment, a tape entrance at one side of the storage compartment adjacent the movable belt, and a tape loop stripping element adjacent the movable belt on the side of the storage compartment opposite the tape entrance.

2. A tape storage apparatus for closed loop tape elements comprising: a bin having a first transverse dimension approximating the width of the tape elements, a continuous movable belt defining the bottom of the bin, a tape entrance to the bin adjacent the movable belt through the side having the first transverse dimension and a tape loop stripping element adjacent the movable belt on the side of the bin opposite the tape entrance.

3. In a tape storage apparatus for closed loop tape elements having an accumulation of tape loops located therein, the improvement comprising: a bin having a first transverse dimension approximating the width of the tape elements, a continuous movable belt defining the bottom of the bin, a tape entrance to the bin adjacent the movable belt through the side having the first transverse dimension, a tape loop stripping element adjacent the movable belt on the side of the bin opposite the tape entrance and means for driving the movable belt whereby tape element loops are formed at the bottom of the bin.

4. A tape transport apparatus equipped with continuous loop storage comprising a storage bin with a tape entrance provided adjacent a movable belt defining the bottom of the bin, an operational compartment located adjacent the storage bin for recording and reproducing information from the tape, the movable belt communicating between the operational compartment and the storage bin whereby tape is taken from the top of the loops accumulated within the bin, transported through the operational compartment under the influence of the belt and passed through the tape entrance into the storage bin where it is formed into loops.

5. A tape transport apparatus equipped with continuous loop storage comprising a storage bin having a first transverse dimension approximating the width of the tape, a movable belt defining the bottom of the bin, means for driving the belt, a tape entrance to the bin adjacent the movable belt through the side having the first transverse dimension, an operational compartment located adjacent the storage bin for recording and reproducing information from the tape, the movable belt communicating between the operational area and the storage bin whereby tape is taken from the top of the loops accumulated within the bin, transported through the operational area under the influence of the belt and passed through the tape entrance into the storage bin where it is formed into loops.

6. In a closed-loop tape recording apparatus comprising a tape drive means, an operational compartment and a tape storage bin having an accumulation of tape loops located therein, the improvement comprising: a tape storage bin having a tape inlet opening at the bottom thereof and a tape outlet opening at the top thereof, a tape transport belt frictionally driven by said tape drive means communicating between the operational compartment and the bin, the belt defining the bottom of the bin, a tape loop stripping element fixed relative to the bin adjacent the transport belt at a spaced interval along the belt from the tape inlet opening, and a tensioning means adjacent the tape outlet opening for guiding the tape under tension from the top of the bin to a point of contact with the transport belt at the entrance to the operational compartment whereby the accumulation of tape loops in the bin adjacent the transport belt and the tape inlet opening guide the tape against the surface of the transport belt.

7. A closed-loop tape recording apparatus comprising a tape drive means, an operational compartment, an enclosed tape storage bin with a first transverse dimension approximating the width of the tape stored therein, a continuous tape transport belt frictionally driven by the tape drive means communicating between the operational compartment and the bin, and forming the bottom of the bin, a tape inlet opening through a side of the bin having the first transverse dimension adjacent the transport belt, a tape outlet opening at the top of the bin, a tape loop stripping element fixed relative to the bin adjacent the transport belt on the side of the bin opposite the tape inlet opening, and tensioning means adjacent the tape outlet opening for guiding the tape under tension from the top of the bin to a point of contact with the transport belt at the entrance to the operational compartment.

8. A closed-loop tape recording apparatus comprising an operational compartment, an enclosed tape storage bin with a first transverse dimension approximating the width of the tape stored therein, a tape drive wheel located at the bottom of the bin, a pinch roller disposed in contact with the tape drive wheel, the point of contact between the drive wheel and pinch roller defining a tape inlet opening, a tape outlet opening at the top of the bin, a continuous tape transport belt driven by the tape drive wheel and passing between the drive wheel and pinch roller at the tape inlet opening, the belt communicating between the operational compartment and the bin, a tape loop stripping element fixed relative to the bin adjacent the transport belt at a spaced interval along the belt from the tape inlet opening, a guide roller adjacent the tape outlet opening and a friction pad adjacent the guide roller for guiding the tape under tension from the top of the bin to a point of contact with the transport belt at the entrance to the operational compartment.

References Cited by the Examiner

UNITED STATES PATENTS 2,979,244 4/1961 Pouliart et al. ---- 226—170 X

FOREIGN PATENTS 1,359,302 3/1964 France.

M. HENSON WOOD, Jr., *Primary Examiner.*

A. N. KNOWLES, *Assistant Examiner.*